Dec. 25, 1962 J. T. ELLIS, JR 3,070,363
SHOCK ABSORBER
Filed March 21, 1960 2 Sheets-Sheet 1
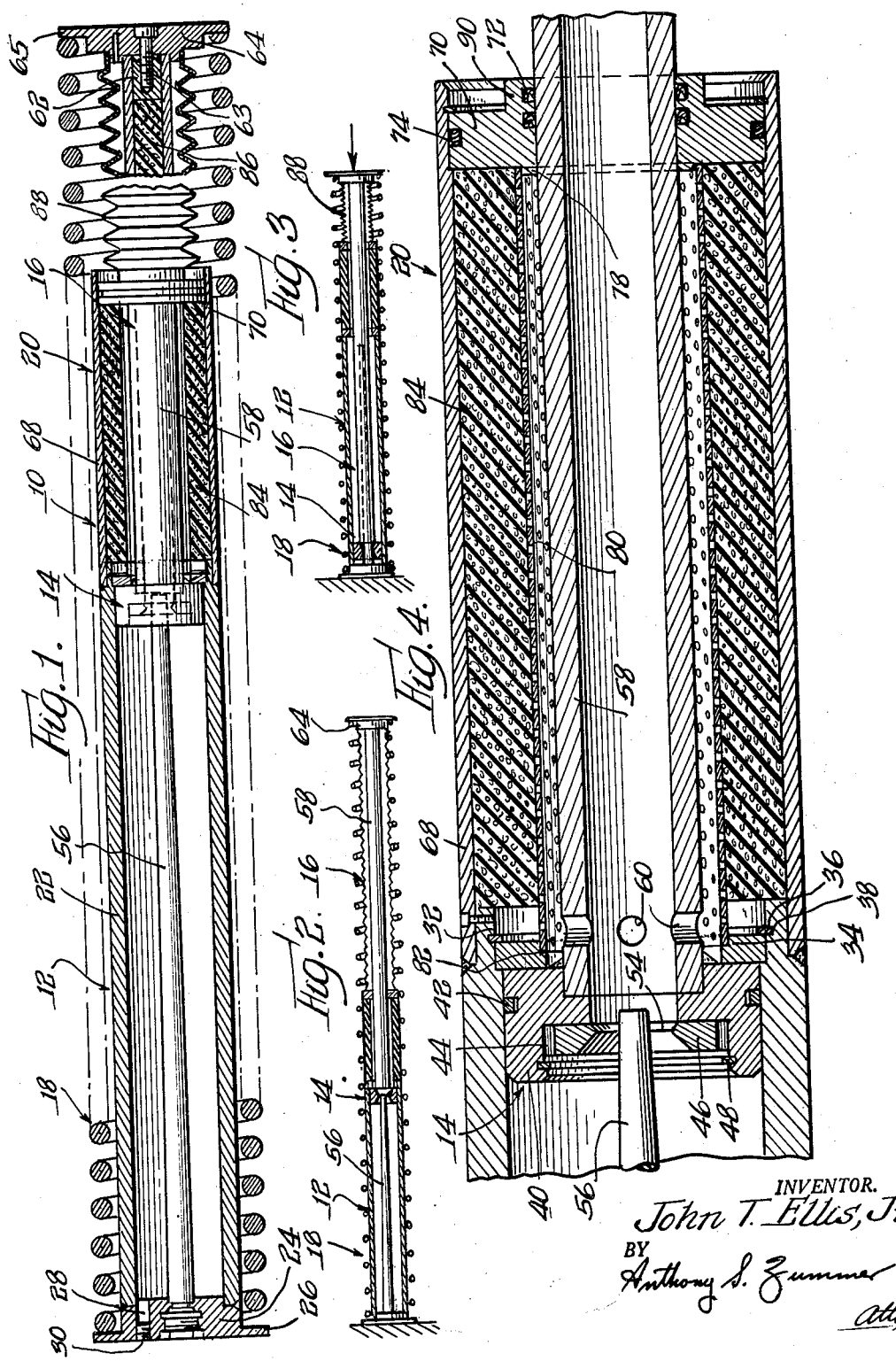
INVENTOR.
John T. Ellis, Jr.
BY
Anthony S. Zummer
Atty.

Dec. 25, 1962  J. T. ELLIS, JR  3,070,363
SHOCK ABSORBER
Filed March 21, 1960  2 Sheets-Sheet 2
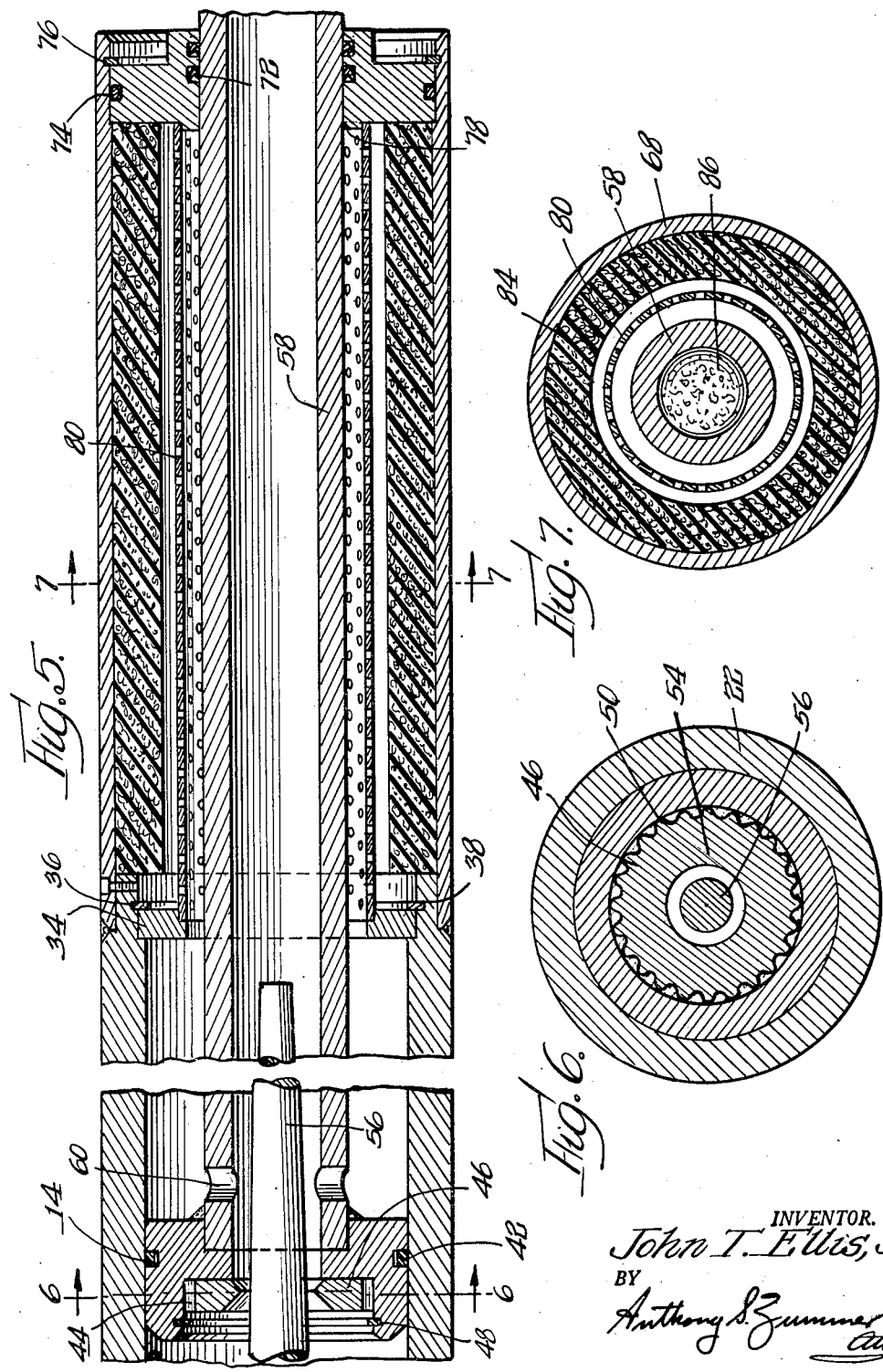
INVENTOR.
John T. Ellis, Jr.
BY
Anthony S. Zummer
Atty.

United States Patent Office 3,070,363
Patented Dec. 25, 1962

3,070,363
SHOCK ABSORBER
John T. Ellis, Jr., Maine Township, Cook County, Ill., assignor to Hanna Engineering Works, Chicago, Ill., a corporation of Illinois
Filed Mar. 21, 1960, Ser. No. 16,228
11 Claims. (Cl. 267—1)

This invention relates to an improvement in shock absorbers, and more specifically to a construction for a novel shock absorber which shock absorber has a unique accumulator construction integral therewith.

The use of accumulators for shock absorbers which operate under high pressure has been greatly desired in view of the accumulator's recognized benefits. The accumulators have not been readily accepted because they are expensive, and they usually require additional complex valving. Accumulators of ordinary construction also take up a considerable amount of space, so that where space is at a premium the accumulators are not acceptable. Furthermore, many accumulators are either operative only in certain positions or they require additional parts to make them operative in all positions.

It is one object of the hereindisclosed invention to provide a novel shock absorber which has an accumulator portion which does not require substantial additional space.

It is another object of the present invention to provide a novel shock absorber which has an accumulating effect, and which shock absorber is operative in any position.

It is a further object of the hereindisclosed invention to provide a shock absorber having a built in accumulator, which shock absorber with the accumulator is simple in construction and does not require additional complex valving.

It is still another object of the instant invention to provide a shock absorber having an accumulator, which shock absorber with accumulator is inexpensive to manufacture.

Other objects and uses of the hereindisclosed invention will become apparent to those skilled in the art upon perusal of the following specification in light of the accompanying drawings in which:

FIGURE 1 is a partial cross-sectional view taken along the axis of a shock absorber embodying the present invention;

FIGURE 2 is a partial cross-sectional view of the shock absorber shown in FIGURE 1 in an extended position;

FIGURE 3 is a cross-sectional view of the shock absorber shown in FIGURE 1 in a compressed position;

FIGURE 4 is an enlarged fragmentary cross-sectional view of the accumulator portion and piston of the shock absorber shown in FIGURE 1 when the shock absorber is in an extended position;

FIGURE 5 is an enlarged cross-sectional view of the accumulator portion of the shock absorber shown in FIGURE 1 with the piston displaced from its extended position so that the shock absorber is in a partially compressed attitude;

FIGURE 6 is a cross-sectional view taken on line 6—6 of FIGURE 5 showing a cross section of the piston; and FIGURE 7 is a cross-sectional view of the accumulator portion taken on line 7—7 of FIGURE 5.

Referring now to the drawings, a shock absorber generally indicated by numeral 10 in FIGURE 1 is a specific embodiment of the present invention. The shock absorber 10 generally consists of a cylinder 12, a piston 14 reciprocal in the cylinder, a ram 16 secured to the piston, a return spring 18, and an accumulator 20 secured to the open end of the cylinder.

Cylinder 12 consists of a right circular cylindrical tube 22 which has one end closed by head 24. The head has annular spring flange 26 formed integral therewith in a conventional manner. The spring flange extends outwardly from the head and has an outside diameter substantially greater than the tube 22. The head also has an opening 28 which provides a passage for introducing a suitable shock absorber fluid or hydraulic fluid into the cylinder. In this instance an oil is used as the hydraulic fluid, although any suitable shock absorber fluid may be used depending upon the particular application of the shock absorber. A plug 30 is threadedly mounted in the opening 28 to seal the opening shut thereby holding the fluid in the cylinder.

The tube 22 has a recessed portion 32 on the interior surface of the tube adjacent to the open end thereof. An annular stop lock 34 engageable with the piston is positioned in the recessed portion 32 and held therein by a lock ring 36. The lock ring 36 is positioned in an annular groove 38 in the recessed portion of the tube, thereby locking the stop lock in position.

The piston 14 is mounted in the cylinder and is reciprocal between the head and the stop lock. The piston includes a piston head 40 which has an outside diameter slightly less than the inside diameter of tube 22. A piston ring 42 is mounted in the outer periphery of the piston head to engage the tube and form a seal therebetween. An aperture 44 is defined in the center of the piston head and an orifice plate 46 is moveably mounted in the piston head. The orifice plate is held in position by a plate retaining ring 48 which is fixed in an annular groove in piston head 40.

The orifice plate is generally annular in construction with a plurality of grooves or slots 50 in its outer periphery. The inner periphery of the orifice plate defines a sharp edged circular orifice 54 through which hydraulic fluid may flow. Orifice 54 is cooperative with a tapered metering pin 56 which is fixed to head 24. The tapered metering pin is fixed to the center of head 24 and extends axially toward the piston so that the pin extends through the aperture 44 and through orifice 54. It is apparent that as the piston head moves toward head 24 the opening in the piston head is diminished by the cooperation of the tapered pin and the orifice plate so that the flow of shock absorber fluid is restricted as the piston approaches head 24.

The ram includes a hollow rod 58 which is welded to piston head 40 in such a manner that the opening in the rod is aligned with aperture 44. It may also be appreciated that as the piston head moves toward head 24 the tapered pin enters the interior of the hollow rod. The rod has a plurality of radial vents 60 which vents are positioned adjacent to the piston head. The end of the ram opposite the piston head is sealed by plug 62 which is welded in the ram. A spring plate 64 is attached to the plug 62 by fastening means which is a screw 63 in this instance. The spring plate has an annular flange 65 which is similar to flange 26. The return spring 18 which has an inside diameter greater than the outside diameter of the cylinder is positioned between the two annular flanges 26 and 65 so that the spring constantly urges the piston head into engagement with the stop lock.

The tube 22 has accumulator 20 attached to the free end of the tube. The tube 22 has its free end reduced so that a tubular casing 68 may be fitted over the edge of the cylinder and secured there by a pin and welded to seal the space between the casing tube and tube 22. It may be seen that the casing tube has its outside diameter substantially equal to the outside diameter of the cylinder while the inside diameter is substantially less.

The free end of the tubular casing is sealed by an annular gland 70 which is positioned in an enlarged portion of the casing. The gland 70 slidingly receives the ram 16 which extends through the accumulator portion and is concentric therewith. A pair of seals 72 positioned in the interior of the gland engage the ram to seal the space therebetween. An O-ring 74 is positioned on the outer periphery of the gland to provide a seal between the gland and the casing. A lock ring 76 mounted in the casing holds the gland in position. The gland has a boss 78 which extends outward toward the piston.

A perforated tube 80 is mounted in engagement with the boss so that the tube surrounds the boss. The tube extends to the annular stop lock which has a recessed portion 82 that receives the tube. The space between perforated tube 80 and the casing is filled with a tubular filler 84 which fills the entire space at low pressure. The filler is in this instance a closed cell cellular buna-N rubber which cells are filled with nitrogen. In this instance, the material used is Rubatex which is manufactured by the Rubatex Division of Great American Industries, Inc., of Bedford, Virginia. It may be seen that the filler occupies a volume greater than one-half the volume between the interior of the casing and the exterior of the hollow rod and bounded on the ends by the gland and a plane defined by lock ring 36.

A cylindrical filler 86 is positioned in the hollow rod 58 adjacent to the plug 62. Filler 86 is also a closed cell cellular rubber filler made of the same material as filler 84 mentioned above.

A boot 88 is attached to a boss 90 extending from the gland and extending to the plate 64 and fixed thereon. This boot covers the exposed portion of the hollow rod in order to protect the rod from dirt, nicks and other damage.

The shock absorber 10 normally rests in its extended position, by virtue of the action of spring 18 which is compressed between flanges 26 and 64, so that piston head 40 is held against stop lock or piston stop means 34. When a load is applied to compress the shock absorber the piston head 40 moves toward cylinder head 24 and the hydraulic fluid contained in the cylinder 22 passes through the sharp-edged orifice 54 to flow behind the piston. As the piston moves forward or to the left, as viewed in the figures, the opening in the orifice is restricted by virtue of the coaction of the plate 46 and the tapered metering pin 56. As the piston moves farther to the left, the sharp-edged orifice is restricted more and more by the taper of the metering pin so that when the piston comes to the end of the stroke the orifice is practically closed by the metering pin.

It is readily appreciated that as the piston moves toward head 24 a length of the piston rod enters the cylinder to reduce the available volume for the hydraulic fluid. The pressure in the cylinder on the right side of the piston builds up and the fillers 84 and 86 are compressed as shown in FIGURE 5 to provide additional volume for the hydraulic fluid. However, the pressure is not so great as to cause leakage past seals 72 and 74. The fillers 84 and 86 of the instant material have been repeatedly compressed 50% without any permanent set in the material.

When the load is relieved from the shock absorber or the load is less than the force of spring 18, the spring 18 tends to pull ram 16 out of the cylinder 12. When the force on ram 16 is sufficiently great to move piston head 40 to the right, the oil behind the piston is compressed and the pressure of the oil moves the annular plate 46 into engagement with the retainer ring 50. The oil is then permitted to flow through the vents 60 around the annular plate 46 and past the plate through the slots 50. As the piston head 40 moves further to the right the opening between the metering pin and the orifice plate is increased so that the oil may flow even more freely through the piston.

Movement of piston head 40 toward lock ring 36 removes a portion of the piston rod from the cylinder thereby providing additional volume for the hydraulic fluid. The fillers then expand to take up the additional volume so that a partial vacuum is not created which could induce air to leak past seals 72 and 74 and contaminate the hydraulic fluid.

Since the instant accumulator requires only a minimum amount of space, the instant device may be used in a variety of applications without expensive adaptations. It is apparent that no special valving is required in the instant device. Furthermore, it may be appreciated that the instant shock absorber works in any position without the use of springs or diaphragms in order to make the shock absorber operative. It may be seen how the present sock absorber is relatively inexpensive to produce in view of the fact that the accumulator portion requires only a pair of additional sleeves and the expansion material.

Although a specific embodiment of the instant invention has been described above, it is apparent to those skilled in the art that many modifications may be made of the instant invention without departing from the spirit and scope thereof and the scope of this invention is to be limited only by the appended claims.

What is claimed is:

1. A hydraulic shock absorber comprising, in combination, an elongated cylinder, a head sealing closed one end of said cylinder, a stop lock mounted in said cylinder adjacent to the other end thereof, a hydraulic fluid contained in said cylinder, a piston moveably mounted in said cylinder and reciprocal between the head and the stop lock, said piston having an orifice for passing the hydraulic fluid through the piston, a metering pin mounted on the head and extending toward the piston cooperative with said orifice to regulate the flow of hydraulic fluid through the piston, a ram connected at one end to said piston, said ram being hollow at the end connected to the piston for receiving said metering pin, a spring plate secured to the other end of said ram, a spring connected to the spring plate and the head urging the piston toward the stop lock, a casing tube sealingly connected to the open end of said cylinder, said casing tube having substantially the same outside diameter as the cylinder, a gland providing a seal between the free end of the casing tube and the ram, a tubular filler positioned within the casing tube and extending from the gland to the cylinder, said tubular filler being closed cell cellular rubber, and a perforated tube extending from the cylinder to the gland engageable with the tubular filler for positioning the filler.

2. In a hydraulic shock absorber having an elongated cylinder, a head mounted on one end of the cylinder to close said end of the cylinder, a hydraulic fluid contained in said cylinder, a piston moveably mounted in said cylinder and moveable through said hydraulic fluid by having said fluid flow from one side of the piston to the other in the opposite direction of the direction of movement of the piston at a given instant, and a ram connected to one side of said piston, the improvement comprising, a hollow casing sealingly mounted on the end of cylinder opposite the end having the head mounted thereon, said casing slidingly receiving the ram and closing the end of the cylinder, said ram defining in cooperation with said piston, fluid communicating means between said cylinder and said casing, means between the casing and the ram sealing the space therebetween, and a closed cell cellular rubber filler in the casing occupying a substantial volume in said casing.

3. A shock absorber comprising, in combination, a cylinder having one end closed, a stop lock mounted adjacent to the other end of said cylinder, a piston mounted in said cylinder and moveable between the closed end of the cylinder and the stop lock, a hollow ram connected at one end to said piston, said ram having an aperture proximate to the piston providing a communicating passage to the interior of the ram, said ram having its free end closed, a spring urging the piston toward the stop lock, a casing connected to the open end of the cylinder, said casing having its free end slidingly sealed to said ram, a closed cell cellular resilient filler positioned in said casing, and a second closed cell cellular resilient filler positioned in the ram adjacent to the closed end, whereby the ram entering the cylinder tends to compress the fillers thereby reducing the pressure in the casing.

4. In a shock absorber having a cylinder, a head closing one end of said cylinder, a piston reciprocal in said cylinder, a ram attached to said piston, and a spring constantly urging said piston toward the open end of said cylinder, the improvement comprising, a tubular member attached to the cylinder adjacent to the open end of said cylinder, a gland sealing the space between the free end of the tubular member and the ram, a perforated tube positioned intercalated the tubular member and the ram, and a closed cell cellular resilient member between the perforated tube and the tubular member, said ram defining in cooperation with said piston, fluid communicating means between said cylinder and said casing, whereby the piston moving in a direction toward the head causes the cellular resilient member to be compressed thereby reducing the pressure in the space partially defined by the piston, tubular member, and the gland.

5. A hydraulic shock absorber comprising, in combination, an elongated cylinder, a head closing one end of said cylinder, a stop lock mounted in the cylinder proximate to the open end of the cylinder, a hydraulic fluid contained in said cylinder, a piston slideably mounted in said cylinder between the head and the stop lock, said piston having an orifice to allow the hydraulic fluid through the piston, a metering pin mounted on the head and cooperative with the orifice in the piston to regulate the flow of hydraulic fluid through the piston, a hollow ram having one end connected to the piston, a spring plate fixed to the other end of the ram, a compression spring mounted between the head and the spring plate urging the piston toward the stop lock, said hollow ram having an aperture proximate to the piston providing a passage between the interior of the ram and the cylinder, a closed cell cellular resilient filler positioned in the ram proximate to the end with the spring plate fixed thereon, a tubular casing having substantially the same outside diameter as the cylinder sealingly connected to the free end of the cylinder, a gland mounted between the tubular casing and the ram sealing the space therebetween, and an elongated annular closed cell cellular resilient filler intercalated the casing and the ram.

6. A hydraulic shock absorber comprising, in combination, an elongated cylinder, a head closing one end of said cylinder, said head having an annular spring flange, a piston reciprocally mounted in said cylinder, said piston having an aperture in its central portion, an orifice plate having a slotted outer periphery moveably mounted on said piston, said plate communicating with said aperture in the piston, a metering pin mounted on the head extending toward the piston, said metering pin cooperative with said orifice plate to regulate the flow of a fluid through the orifice plate, a hollow ram attached to the piston, said ram having its interior communicating with the piston aperture to receive the metering pin, said ram having an aperture in its side providing a communicating passage from the interior of the ram, said ram having closed its end opposite the end attached to the piston, a spring plate attached to the closed end of the ram, a coil compression spring surrounding the cylinder and having its opposite ends engaging the spring plate and spring flange respectively to urge constantly the piston away from the head, a stop lock mounted in said cylinder adjacent to the end opposite the head and engageable with piston for retaining the piston within the cylinder, a casing tube sealingly attached to the cylinder adjacent to the stop lock, said casing tube having an outside diameter substantially equal to the outside diameter of the cylinder and an inside diameter greater than the inside diameter of the cylinder, an annular gland plate mounted within the casing tube and slidably receiving the ram and providing a seal therebetween, a perforated tube extending from the gland plate to the stop lock, a tubular closed cell resilient rubber filler occupying the space between casing tube and the perforated tube, and a cylindrical closed cell resilient rubber filler positioned within the ram proximate to the closed end of said ram, whereby the metering pin and orifice plate cooperate to regulate the flow of fluid through the piston during movement of the piston toward the head, and the positioning of a substantial length of ram in the cylinder compresses the fillers to provide sufficient space for the fluid.

7. A shock absorber comprising, in combination, a cylinder having one end closed, a stop lock mounted adjacent to the other end of said cylinder, a hydraulic fluid in said cylinder, a piston mounted in said cylinder and moveable between the closed end of the cylinder and the stop lock, said piston having an orifice for the passage of hydralic fluid therethrough, a hollow ram connected at one end to said piston, said ram having an aperture proximate to the piston providing a communicating passage to the interior of the ram, said ram having its free end closed, a spring disposed between said cylinder and said ram urging the piston toward the stop lock, a casing connected to the open end of the cylinder, said casing having its free end slidingly sealed to said ram, and a closed cell cellular resilient filler positioned in said casing, whereby the ram entering the cylinder tends to compress the filler thereby reducing the pressure build-up in the casing.

8. A hydraulic shock absorber comprising, in combination, an elongated cylinder, a head closing one end of said cylinder, a stop lock mounted in the cylinder proximate to the open end of the cylinder, a hydraulic fluid contained in said cylinder, a piston slideably mounted in said cylinder between the head and the stop lock, said piston having an orifice to allow the hydraulic fluid through the piston, a metering pin mounted on the head and cooperative with the orifice in the piston to regulate the flow of hydraluic fluid through the piston, a hollow ram having one end connected to the piston, a spring plate fixed to the other end of the ram, a compression spring mounted between the head and the spring plate urging the piston toward the stop lock, said hollow ram having an aperture proximate to the piston providing a passage between the interior of the ram and the cylinder, a tubular casing having substantially the same outside diameter as the cylinder sealingly connected to the free end of the cylinder, a gland mounted between the tubular casing and the ram sealing the space therebetween, and an elongated annular closed cell cellular resilient filler intercalated the casing and the ram.

9. A hydraluic shock absorber comprising, in combination, an elongated cylinder having one end closed, a stop lock mounted in the cylinder proximate to the open end of the cylinder, a hydraulic fluid contained in said cylinder, a piston slideably mounted in said cylinder between the head and the stop lock, said piston having an orifice to allow the hydraulic fluid through the piston, a metering pin mounted on the head and cooperative with the orifice in the piston to regulate the flow of hydraulic fluid through the piston, a hollow ram having one end connected to the piston for telescopically receiving the metering pin, said hollow ram having an aperture proximate to the piston providing a passage between the interior of the ram and the cylinder, a tubular casing having substantially the same outside diameter as the cylinder sealingly connected to the free end of the cylinder, a gland mounted between the tubular casing and the ram sealing the space therebetween, and an elongated annular closed cell cellular resilient filler intercalated the casing and the ram.

10. A shock absorber comprising in combination a cylinder having one end thereof closed, hydraulic fluid contained in said cylinder, a piston having an orifice therethrough slidably mounted in said cylinder, a hollow ram connected at one end to said piston, said ram having its free end closed, resilient means intermediate said cylinder and said ram for urging the piston away from said closed end of said cylinder, a casing connected to the open end of the cylinder, said casing having its free end slidingly sealed to said ram, said ram in cooperation with said piston defining fluid communication means between said cylinder and said casing, a closed cell cellular resilient filler positioned in said casing whereby the ram entering the cylinder tends to compress said filler for reducing pressure build-up in said casing.

11. A shock absorber comprising in combination a cylinder having one end thereof closed, hydraulic fluid contained in said cylinder, a piston having an orifice therethrough slidably mounted in said cylinder, a hollow ram connected at one end to said piston, said ram having its free end closed, resilient means intermediate said cylinder and said ram for urging the piston away from said closed end of said cylinder, a casing connected to the open end of the cylinder, said casing having its free end slidingly sealed to said ram, said ram in cooperation with said piston defining fluid communication means between said cylinder and said casing, a first closed cell cellular resilient filler in said casing, and a second closed cell cellular resilient filler positioned in said hollow ram adjacent the closed end thereof whereby said fillers tend to be compressed by fluid displaced by said ram when said ram enters said cylinder.

References Cited in the file of this patent

UNITED STATES PATENTS

| | | |
|---|---|---|
| 2,224,306 | Krueger | Dec. 10, 1940 |
| 2,392,387 | Joy | Jan. 8, 1946 |
| 2,495,693 | Byrd et al. | Jan. 31, 1950 |
| 2,701,583 | Rux | Feb. 8, 1955 |
| 2,701,714 | Harwood | Feb. 8, 1955 |
| 2,939,696 | Tuczek | June 7, 1960 |

FOREIGN PATENTS

| | | |
|---|---|---|
| 454,987 | Great Britain | Oct. 12, 1936 |